US010904700B2

(12) United States Patent
Cepuran

(10) Patent No.: US 10,904,700 B2
(45) Date of Patent: Jan. 26, 2021

(54) COMMON PLATFORM FOR PERSONALIZED/BRANDED APPLICATIONS

(71) Applicant: D2L CORPORATION, Kitchener (CA)

(72) Inventor: Brian Cepuran, Kitchener (CA)

(73) Assignee: D2L Corporation, Kitchener (CA)

( * ) Notice: Subject to any disclaimer, the term of this patent is extended or adjusted under 35 U.S.C. 154(b) by 0 days.

(21) Appl. No.: 14/030,409

(22) Filed: Sep. 18, 2013

(65) Prior Publication Data

US 2015/0080026 A1 Mar. 19, 2015

(51) Int. Cl.
*H04W 4/029* (2018.01)
*H04W 4/02* (2018.01)
*H04W 64/00* (2009.01)

(52) U.S. Cl.
CPC .................................... *H04W 4/029* (2018.02)

(58) Field of Classification Search
CPC .... H04W 4/02; H04W 64/00; H04L 29/08657
USPC .......... 455/456.3, 456.1, 414.1, 404.2, 432.3
See application file for complete search history.

(56) References Cited

U.S. PATENT DOCUMENTS 5,946,618 A * 8/1999 Agre .................. H04B 7/18539 455/428
8,743,145 B1 * 6/2014 Price ..................... G06T 19/006 345/633
2003/0009591 A1 * 1/2003 Hayball .................. H04L 29/06 709/245
2004/0260464 A1 * 12/2004 Wong ............................ 701/209
2006/0199608 A1 * 9/2006 Dunn .................... H04W 36/14 455/552.1
2007/0155396 A1 * 7/2007 Kim ....................... G08G 1/092 455/453
2008/0288166 A1 * 11/2008 Onishi .................. G01C 21/20 701/533
2010/0285781 A1 * 11/2010 Dai et al. ................... 455/414.1
2012/0016577 A1 * 1/2012 Kim et al. .................... 701/201
2012/0136815 A1 * 5/2012 Ozawa ............................ 706/12
2012/0299960 A1 * 11/2012 Soderstrom .................. 345/629
2013/0091452 A1 * 4/2013 Sorden .................... G06F 3/048 715/771

* cited by examiner

*Primary Examiner* — Nghi H Ly
(74) *Attorney, Agent, or Firm* — Gowling WLG (Canada) LLP; Neil W. Henderson

(57) ABSTRACT

The disclosure is directed at a method of personalizing an application for displaying, on a mobile communication device, user content associated with a site, the method comprising determining location of the mobile communication device, calculating travel characteristics of the mobile communication device, determining presence of a site, obtaining user preferences for display of user content, and retrieving and displaying user content associated with the site on the mobile communication device.

22 Claims, 6 Drawing Sheets

10
16
16
14
12
Server
Server
14
Server

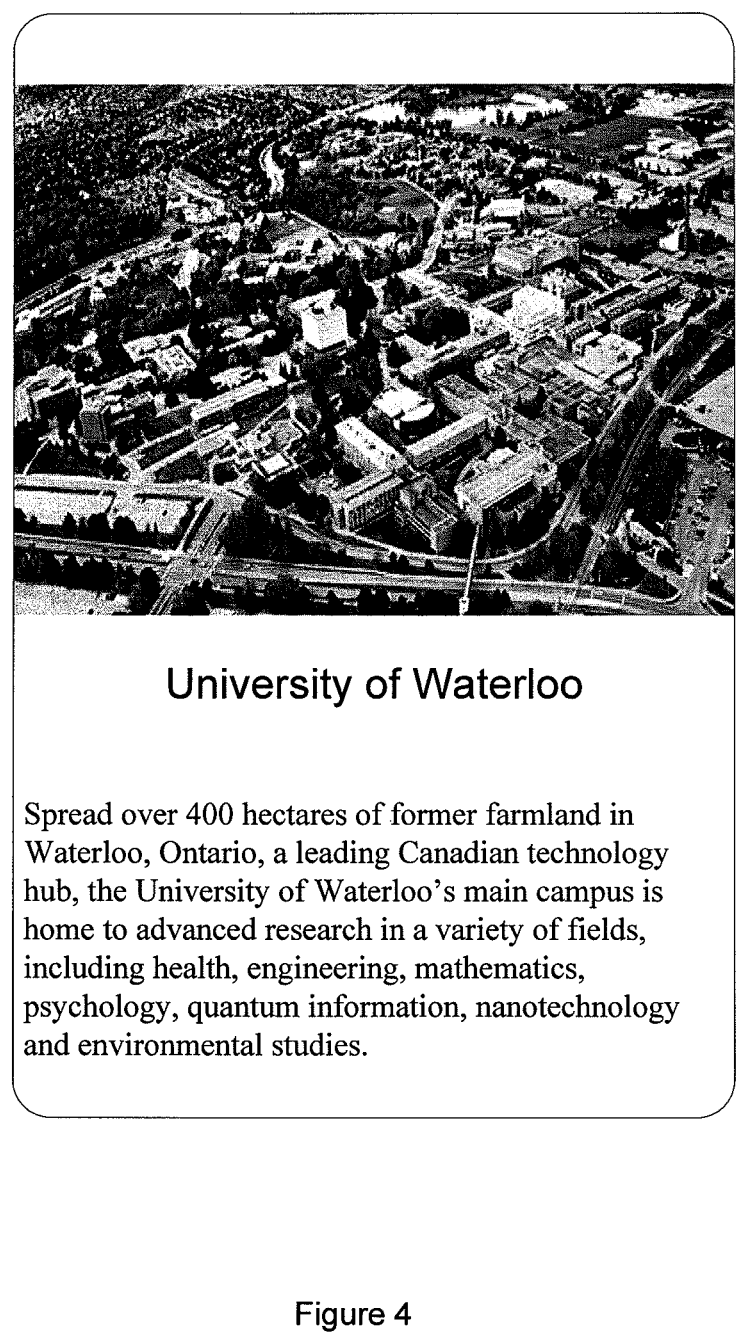

University of Waterloo

Spread over 400 hectares of former farmland in Waterloo, Ontario, a leading Canadian technology hub, the University of Waterloo's main campus is home to advanced research in a variety of fields, including health, engineering, mathematics, psychology, quantum information, nanotechnology and environmental studies.

Figure 4

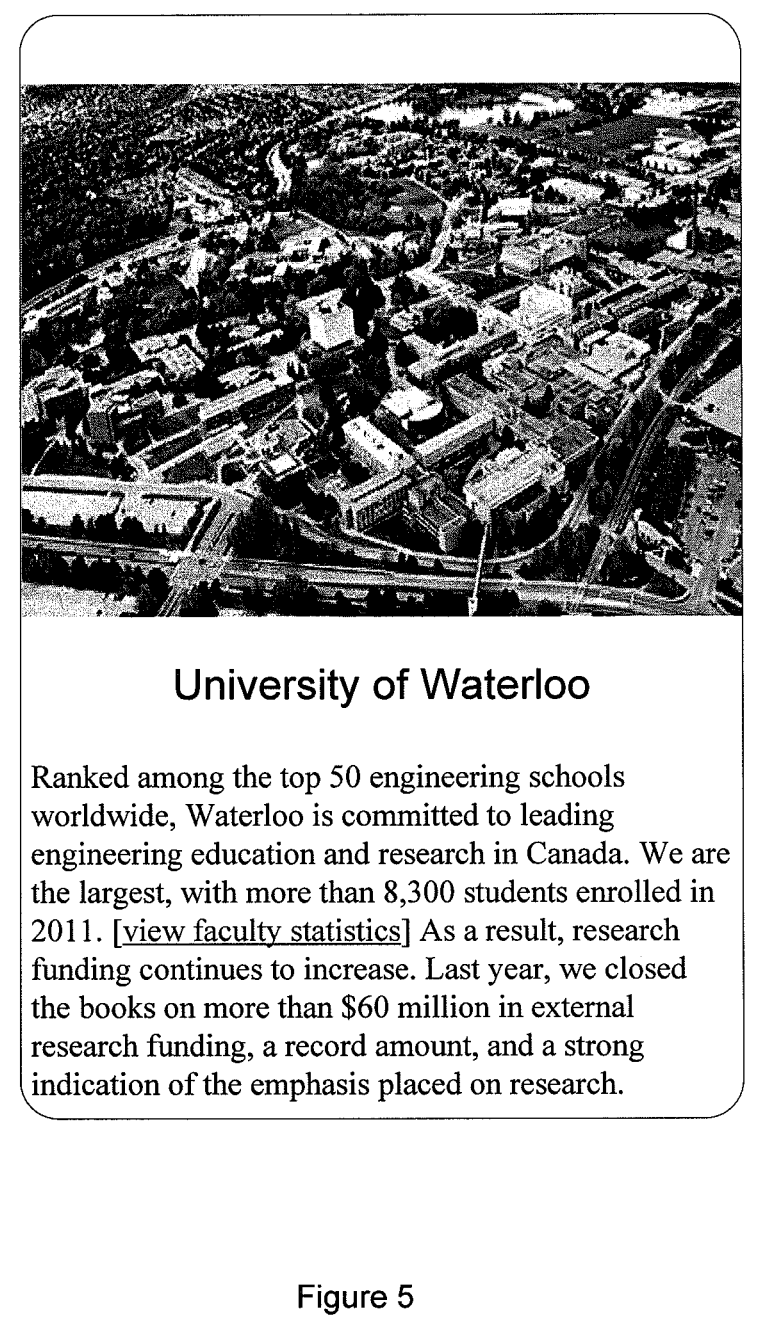

University of Waterloo

Ranked among the top 50 engineering schools worldwide, Waterloo is committed to leading engineering education and research in Canada. We are the largest, with more than 8,300 students enrolled in 2011. [view faculty statistics] As a result, research funding continues to increase. Last year, we closed the books on more than $60 million in external research funding, a record amount, and a strong indication of the emphasis placed on research.

Figure 5

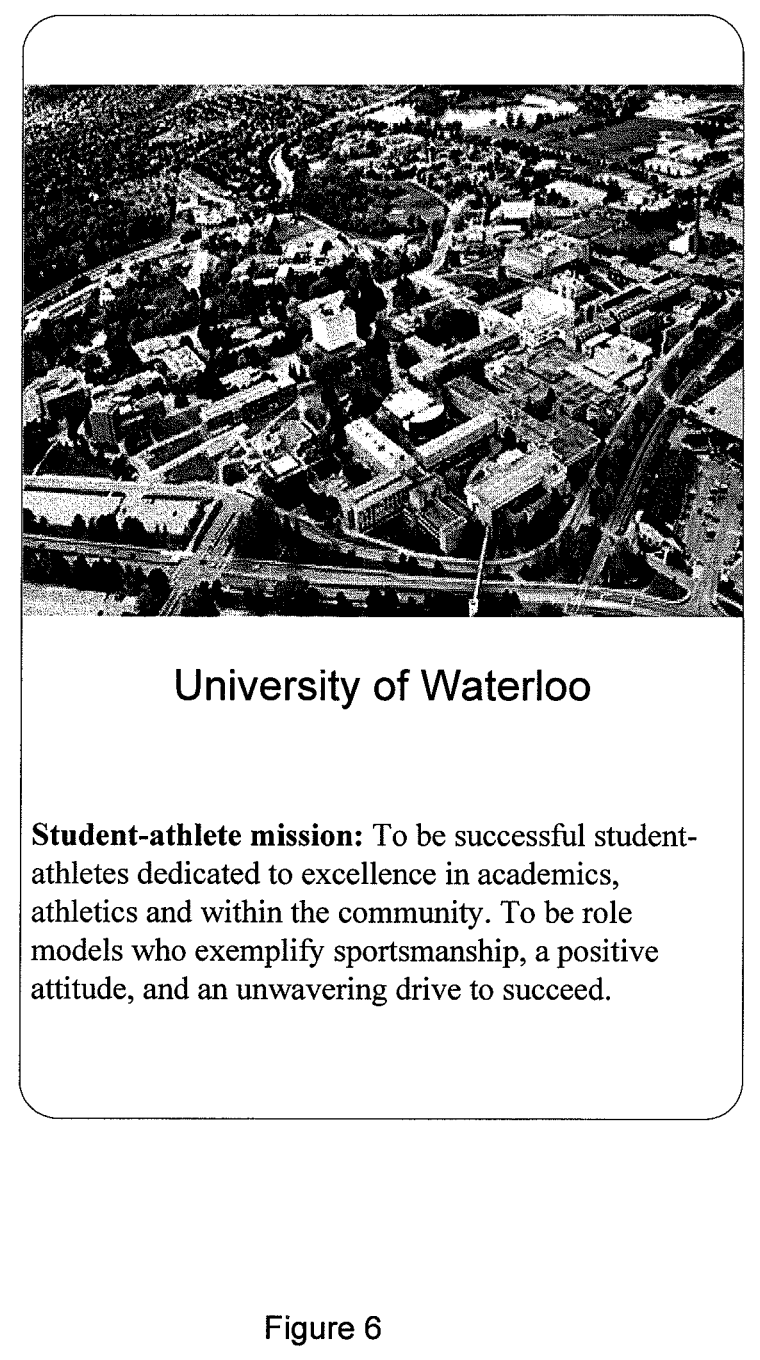

University of Waterloo

Student-athlete mission: To be successful student-athletes dedicated to excellence in academics, athletics and within the community. To be role models who exemplify sportsmanship, a positive attitude, and an unwavering drive to succeed.

Figure 6

COMMON PLATFORM FOR PERSONALIZED/BRANDED APPLICATIONS

FIELD

The present disclosure relates generally to personalizing applications. More particularly, the present disclosure relates to systems and methods for providing a common platform for personalized/branded applications.

BACKGROUND

In the digital technology age, users are regularly relying on their mobile communication devices to access information. Mobile communication devices typically have applications stored within to retrieve such information. The introduction of these applications has led to the use of mobile communication devices in previously unconsidered ways.

One of these uses is as a device for gathering or receiving information. Applications executing on these devices may allow a user to retrieve or view information or user content based on their geographical location whereby the information can be retrieved and viewed on-the-fly. The opportunity to obtain certain information on demand by the user has been improved by the use of these applications.

In many current solutions, the information being retrieved is associated with an individual application stored in the mobile communication device. Therefore, for individuals wishing to retrieve information from multiple sources, multiple applications are required.

Therefore, there is provided a novel method and system for providing a common platform for personalized/branded applications.

The above information is presented as background information only to assist with an understanding of the present disclosure. No determination has been made, and no assertion is made, as to whether any of the above might be applicable as prior art with regard to the present disclosure.

SUMMARY

It is an object of the present disclosure to obviate or mitigate at least one disadvantage of previous methods and systems for displaying information to users on a mobile communication device.

In one aspect, there is provided a method of personalizing an application for displaying, on a mobile communication device, user content associated with a site, the method including determining location of the mobile communication device; calculating travel characteristics of the mobile communication device; determining presence of a site; obtaining user preferences for display of user content; and retrieving and displaying user content associated with the site on the mobile communication device.

In another aspect, determining location of the mobile communication device includes accessing location software on the mobile communication device.

In another aspect, the location software is global positioning system (GPS).

In a further aspect, calculating travel characteristics includes at least one of determining direction of travel of the mobile communication device or determining speed of travel of the mobile communication device.

Another aspect of the disclosure is that determining presence of a site includes determining list of sites proximate the location of the mobile communication device; and creating a list of sites of interest from the list of sites based on travel characteristics of the mobile communication device.

In yet a further aspect, displaying the list of sites of interest for selection by a user; and receiving user's selection of site.

In another aspect, choosing a site from the list of sites of interest is based on user criteria.

A further aspect includes obtaining user preferences for display of user content by accessing a database storing displaying requirements associated with a user of the mobile communication device.

In yet a further aspect, the method or personalizing is performed within a learning management system.

In another aspect, there is provided a computer program product including a computer readable memory storing computer executable instructions thereon that when executed by a computer to perform steps of determining location of the mobile communication device; calculating travel characteristics of the mobile communication device; determining presence of a site; obtaining user preferences for display of user content; and retrieving and displaying user content associated with the site on the mobile communication device.

In yet another aspect, there is provided a method of displaying, within a customized application, user content for a site of interest to a user associated with a mobile communication device including determining location of the mobile communication device; creating list of sites of interest in proximity to the mobile communication device; obtaining travel characteristics of the mobile communication device; selecting a site of interest from the list of sites of interest based on travel characteristics and location of the mobile communication device; checking user defined preferences for display of user content for the customized application; and displaying customized application within user content associated with selected site of interest.

In yet another aspect, determining location of the mobile communication device includes accessing location software on the mobile communication device.

In a further aspect of the disclosure, the location software is a global positioning system (GPS).

A further aspect of the disclosure includes creating list of sites of interest by comparing location of mobile communication device with sites of interest stored in a database; and selecting sites of interest in the database which are within a specified distance from the location of the mobile communication device to create a list of sites of interest.

In another aspect, comparing location includes comparing location of mobile communication device with location data corresponding to the list of places of interest.

In a further aspect, obtaining travel characteristics includes retrieving direction of travel of the mobile communication device and speed of travel of the mobile communication device.

Other aspects and features of the present disclosure will become apparent to those ordinarily skilled in the art upon review of the following description of specific embodiments in conjunction with the accompanying Figures.

BRIEF DESCRIPTION OF THE DRAWINGS

Embodiments of the present disclosure will now be described, by way of example only, with reference to the attached Figures

FIG. 4 is an example of a mobile communication device displaying a branded application according to an exemplary embodiment of the present disclosure;

FIG. 5 is another example of a mobile communication device displaying a branded application according to an exemplary embodiment of the present disclosure; and FIG. 6 is a further example of a mobile communication device displaying a branded application according to an exemplary embodiment of the present disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of exemplary embodiments of the disclosure as defined by the claims and their equivalents. The following description includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

Generally, the present disclosure provides a method and system for providing a common platform for personalized/branded applications. In an embodiment, the disclosure is for use with a mobile communication device.

In one embodiment, the system comprises a mobile communication device which is in communication with various external servers for receiving information from these servers. The external servers are associated with entities, such as, but not limited to, academic institutions, restaurants or points of interest. In operation, there is an assumption of a desire for obtaining information by the user from these different entities. The mobile communication device has means or modules stored within for assisting with obtaining the information.

In the current system, as the user is travelling past different entities, the location and the travel characteristics of the mobile communication device are determined in order to have information transmitted or pushed to the device or to assist in the retrieval of information by the mobile communication device. For instance, in one example, based on the geographical location of the mobile communication device and the speed at which the mobile communication device is travelling, the mobile communication device may transmit a message to a server to obtain information about an entity.

Figure 1:
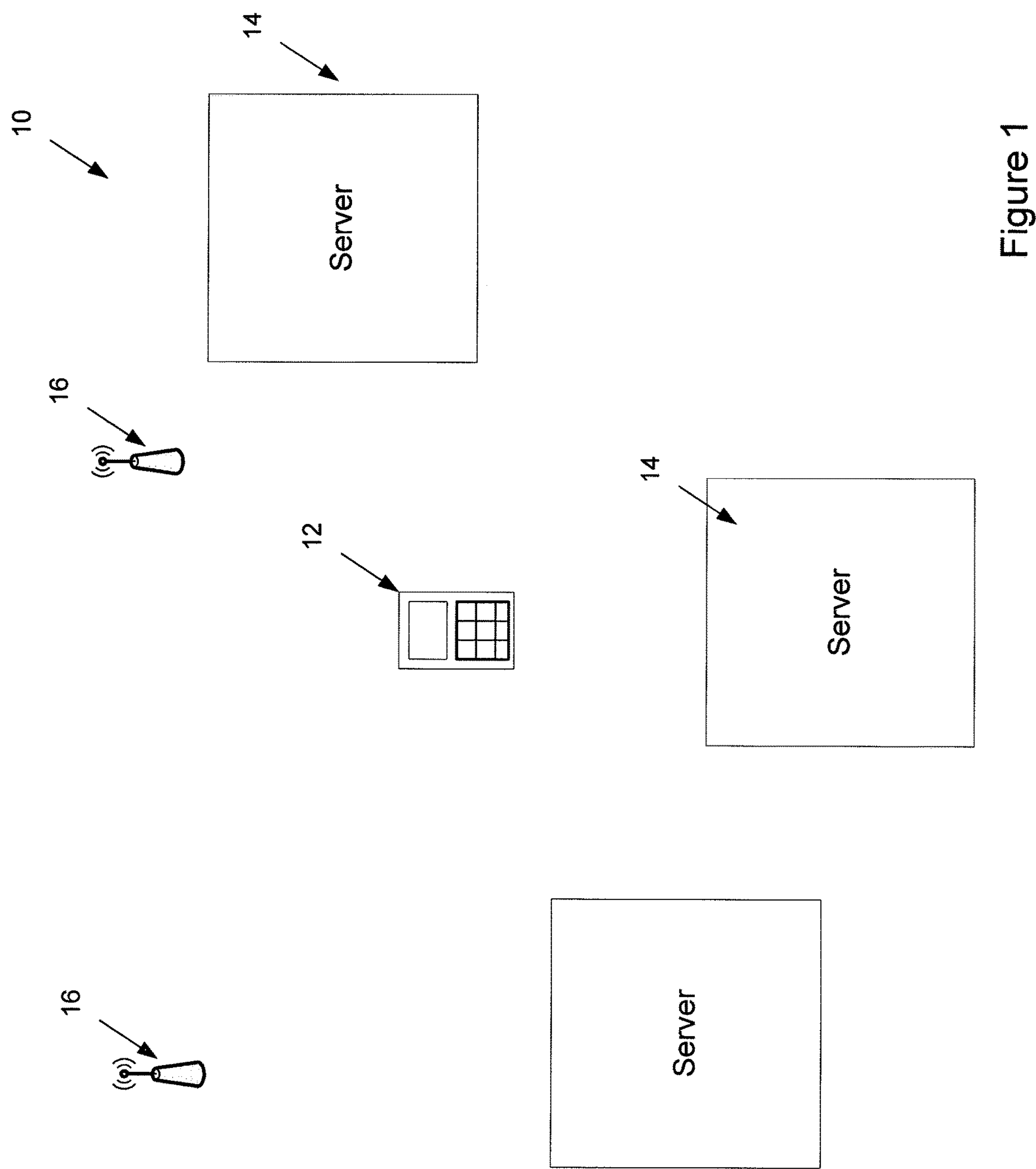
FIG. 1 is schematic diagram of a system for mobile communication device communication according to an exemplary embodiment of the present disclosure.

Turning to FIG. 1, a system for communicating with a mobile communication device is shown according to an exemplary embodiment of the present disclosure. The system 10 includes a mobile communication device 12 which is associated with a user. Information may be transmitted and received between the mobile communication device 12 and multiple servers 14 which are associated with entities or sites from which the user may wish to receive or retrieve information. The mobile communication device 12 may also be in communication with location determination apparatus 16 such as, but not limited to, Global Positioning Service (GPS) apparatus. Other location determination apparatus are also contemplated. The location determination apparatus assists to determine the location of the mobile communication device 12.

Figure 2:
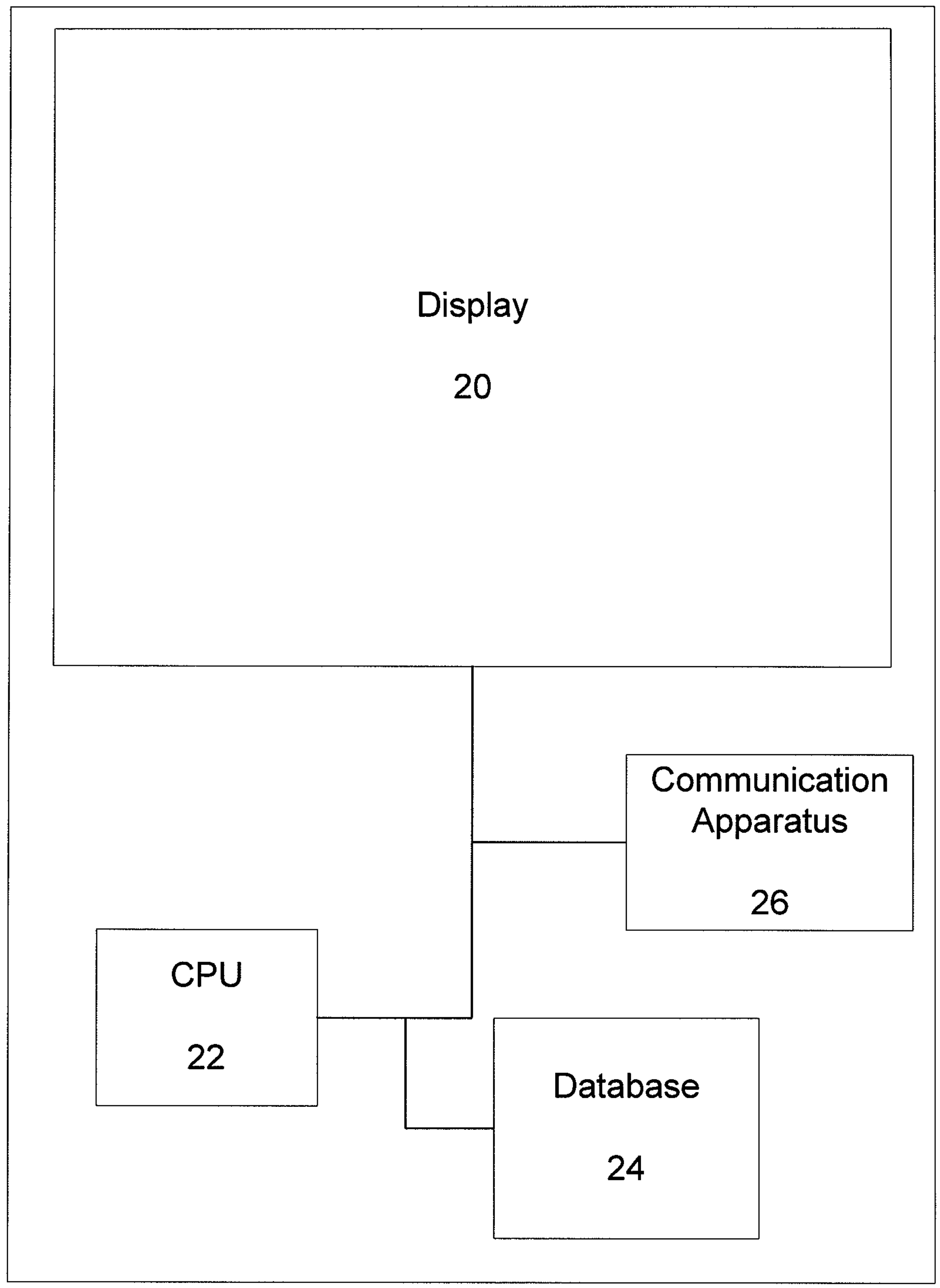
FIG. 2 is a schematic diagram of a mobile communication device according to an exemplary embodiment of the present disclosure.

Turning to FIG. 2, a schematic diagram of a mobile communication device is shown according to an exemplary embodiment of the present disclosure. As shown, the mobile communication device 12 comprises a display 20, a processor 22, a database 24 and communication apparatus 26. In one embodiment, the communication apparatus 26 includes an antenna for transmitting information to and receiving information from the servers 14. The handling of the communication between the mobile communication device 12 and a server 14 will be understood by one skilled in the art.

Figure 3:
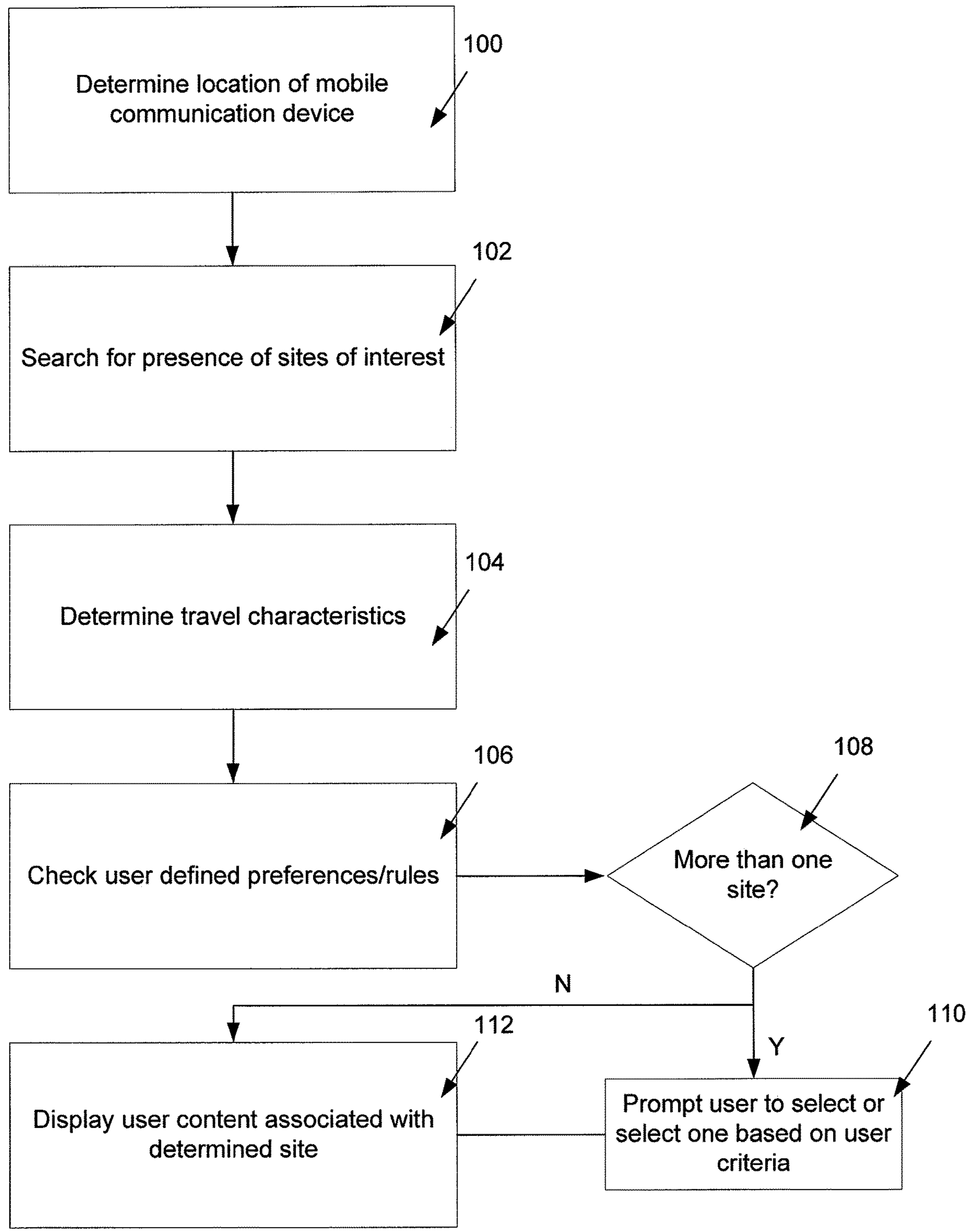
FIG. 3 is a flowchart outlining a method of providing a common platform for personalized/branded applications according to an exemplary embodiment of the present disclosure.

Turning to FIG. 3, a flowchart outlining a method of providing a common platform for personalized/branded applications is shown according to an exemplary embodiment of the present disclosure. It is assumed that the mobile communication device has computer readable medium prestored which assist in implementing the method of providing a common platform for personalized/branded applications.

In operation, the location of the mobile communication device is determined 100. In one embodiment, the location of the mobile communication device may be determined via known methods such as, but not limited to, Global Positioning System (GPS) technology or cellular geolocation. The location of the mobile communication device may also be determined by having a user enter address information associated with their location. This address information may include, but is not limited to, a postal code, a zip code, a point of interest, an academic institution, a city name, or an intersection of two streets.

After the location of the mobile communication device is determined, a search is performed to see if there are any sites of interest nearby 102. A site of interest may be defined as a location or an entity having user content that can be delivered to the mobile communication device for review by the user or user content which may be requested by the user. For instance, if a user is walking past a mall, a site of interest could be any store or restaurant within the mall or the mall itself. In another example, the user may be driving in a city where an academic institution may be a site of interest. In a further example, the user may be walking around an academic institution and departments or buildings within the academic institution may be a site of interest. The sites of interested may be previously stored in the database or servers associated with the sites of interested may communication this to the processor of the mobile communication device.

After the sites of interest are determined, the travel characteristics of the mobile communication device are determined 104. As understood, the mobile communication device itself does not do any travelling by itself but is associated with the travel patterns of its owner or user. For instance, the user may be driving in a car, riding on a bus or walking on the street. The travel characteristics may include, but are not limited to, speed of travel and direction of travel. The determination of the travel characteristics provide an indication as to which sites may be of interest. For example, if a user is riding a bus past a mall, the sites of interest within the mall may be ruled out as sites of interest due to speed of travel past the mall, however, sites which are farther down the road, in the direction of travel, may be of more interest.

In order to determine travel characteristics, the processor within the mobile communication device may continuously retrieve positioning information and compare the most recent retrieve position with the last known position in order to determine direction or travel. Speed may be determined by calculating the distance travelled with respect to time elapsed since the last position was retrieved.

After the travel characteristics are determined, the user defined preferences or rules for display of user content or information are retrieved 106. These user defined preferences or rules are preferably stored in a database within the mobile communication device. These preferences may be directed at the nature of the display of user content or information on the mobile communication device to the user. For instance, if the site of interest is an academic institution, the user may wish to only see information relating to scholarships available to students. Alternatively, the user may only wish to see the food options available at the academic institution. In another example, if the sites of interest are restaurants, the user may only want to see the drink menu rather than a full menu and therefore, the information which is displayed to the user may be restricted to drinks.

A check is then performed to determine if there is more than one site of interest in the proximity of the mobile communication device 108 or which fall within the location and travel characteristics of the mobile communication device. If there is more than one site of interest, the user is provided with a prompt to select one of the sites of interest 110. In one example, the list of sites of interest are listed on the display and the user can select the one which they wish to view user content from. Alternatively, the processor may determine the site of interested associated with the user content the user wishes to view based on previously stored user criteria. After the site of interest has been determined, the user content is retrieved and displayed to the user 112.

If there is only one site of interest in the determination of 108, the user content for this site of interest is immediately retrieved and displayed to the user 112.

While the methods have been disclosed with individual steps, the order in which the steps are performed may be interchanged and not necessarily in the order as outlined in FIG. 1.

Turning to FIG. 4, an example of a mobile communication device displaying a branded application according to an exemplary embodiment of the present disclosure is shown. In the current Figure, it is assumed that the user is interested in obtaining information about academic institutions that are in proximity to the user's location. FIG. 4 shows a mobile communication device displaying a branded application such as would be displayed to a user in 112 of the flowchart of FIG. 3.

As shown in FIG. 4, the mobile communication device 12 includes a display 20 for displaying the branded application to the user. The information which is displayed to the user may include an indication or identification 30 of the academic institution (University of Waterloo) along with a picture 32 showing the campus. As will be understood, other information relating to an identification of the academic instruction may be displayed. Based on the user's preferences with respect to the branded application, information 34 relating to the academic institution is displayed. This is assuming that the user defined preferences/rules indicate that the user wishes to review background information on academic institutions when they are selected as a site of interest.

Turning to FIG. 5, another example of a mobile communication device displaying a branded application according to an exemplary embodiment of the present disclosure is shown. In this figure, it is assumed that the user defined preferences/rules with respect to the branded application require that information relating to the engineering programs with respect to the academic institution be displayed.

As shown in FIG. 5, the mobile communication device 12 includes a display 20 for displaying the branded application to the user. The information which is displayed to the user may include an indication or identification 30 of the academic institution (University of Waterloo) along with a picture 32 showing the campus. As will be understood, other information relating to an identification of the academic instruction may be displayed. Based on the user's preferences with respect to information about engineering programs, information 34 relating to the engineering program associated with the academic institution is displayed.

Turning to FIG. 6, another example of a mobile communication device displaying a branded application according to an exemplary embodiment of the present disclosure is shown. In this figure, it is assumed that the user defined preferences/rules with respect to the branded application require that information relating to the athletics program with respect to the academic institution be displayed.

As shown in FIG. 6, the mobile communication device 12 includes a display 20 for displaying the branded application to the user. The information which is displayed to the user may include an indication or identification 30 of the academic institution (University of Waterloo) along with a picture 32 showing the campus. As will be understood, other information relating to an identification of the academic instruction may be displayed. Based on the user's preferences with respect to information about athletic program, information 34 relating to the athletic program associated with the academic institution is displayed.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a non-transitory medium (also referred to as a non-transitory computer-readable medium, a non-transitory processor-readable medium, or a non-transitory computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The non-transitory machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the non-transitory machine-readable medium. The instructions stored on the non-transitory machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method of personalizing an application for displaying, on a mobile communication device, user content associated with at least one site, the method comprising:

determining, by the mobile communication device, location of the mobile communication device based at least in part on one or more of information received from a Global Positioning System (GPS) module and cellular geolocation information;

calculating, by the mobile communication device, travel characteristics of the mobile communication device, wherein the travel characteristics include a speed at which the mobile communication device is travelling;

receiving, from a server, information associated with the location based at least in part on the location and the travel characteristics of the mobile communication device, the server selected from a plurality of servers based at least in part on the information stored within the server of user content associated with a plurality of sites proximate the location and on the travel characteristics of the mobile device;

determining presence of at least one site of the plurality of sites based at least in part on the information associated with the location;

obtaining, based in part on the at least one site, user defined preferences for display of user content; and retrieving and displaying, based in part on the user defined preferences, user content associated with the site on the mobile communication device, wherein the user defined preferences are directed at the nature of the displayed user content.

2. The method of claim 1 wherein determining location of the mobile communication device comprises accessing location software on the mobile communication device.

3. The method of claim 2 wherein the location software is GPS software.

4. The method of claim 1 wherein calculating travel characteristics comprises determining a direction of travel of the mobile communication device.

5. The method of claim 1 wherein determining presence of at least one site comprises:

determining list of sites proximate the location of the mobile communication device; and creating a list of sites of interest from the list of sites based on travel characteristics of the mobile communication device.

6. The method of claim 5 further comprising:

displaying the list of sites of interest for selection by a user; and receiving user's selection of site.

7. The method of claim 5 further comprising:

choosing a site from the list of sites of interest based on user criteria.

8. The method of claim 1 wherein obtaining user preferences for display of user content comprises:

accessing a database storing displaying requirements associated with a user of the mobile communication device.

9. The method of claim 1 wherein the method is performed within a learning management system.

10. The method of claim 1, wherein the application is a customized application.

11. The method of claim 10, further comprising:

selecting a site of interest from a list of sites of interest based on travel characteristics and location of the mobile communication device, wherein the determining of the presence of the at least one site comprises generating a list of sites of interests.

12. The method of claim 11, wherein the retrieving and displaying user content associated with the at least one site on the mobile communication device comprises:

checking user defined preferences for display of user content for the customized application; and displaying the customized application within user content associated with selected site of interest.

13. The method of claim 1, wherein the retrieving and displaying user content associated with the site on the mobile communication device comprises:

branding the application based at least in part on the at least one site and the user preferences for display of user content.

14. The method of claim 1, wherein the determining of presence of the site comprises:

determining that at least one site is a site of interest.

15. The method of claim 14, wherein the site of interest is stored in a database storing a plurality of sites of interest associated with a user.

16. The method of claim 15, further comprising:

receiving, from the database, information associated with one or more of the plurality of sites of interest associated with the user, wherein the determining the presence of the at least one site comprises determining the presence of the at least one site based at least on a comparison between the received information associated with the location and the database storing the plurality of sites of interest associated with the user.

17. The method of claim 16, further comprising:

in the event that a plurality of sites are determined to be present, prompting the user to select one of the plurality of sites, wherein the retrieving and displaying user content associated with the at least one site on the mobile communication device comprises retrieving and displaying user content associated with the selected one of the plurality of sites.

18. The method of claim 1, further comprising:

sending, by the mobile communication device, a request for information associated with a location, based at least in part on the information associated with the location of the mobile communication device and the travel characteristics of the mobile communication device, wherein the mobile communication device sends the location and travel characteristics of the mobile communication device to the server in connection with the request.

19. The method of claim 1, wherein the retrieving and displaying user content associated with the site on the mobile communication device comprises:

configuring an application associated with a learning management system based on one or more of the information associated with the location that is received from the server, the location of the mobile communication device, and the travel characteristics, wherein the application provides information relating to an academic institution, and wherein the configuring includes one or more of:

personalizing the application for user associated with the learning management system; and branding the application for the academic institution in proximity to the mobile communication device.

20. The method of claim 1, wherein a type of the user content received is configurable by a user based at least in part on the user preferences for desired type of user content.

21. The method of claim 1, wherein the travel characteristics include a direction in which the mobile communication device is travelling.

22. A non-transitory computer readable storage medium storing instructions that, when executed, cause at least one processor to:

determine location of a mobile communication device based at least in part on one or more of information received from a Global Positioning System (GPS) module and cellular geolocation information;

calculate travel characteristics of the mobile communication device, wherein the travel characteristics include a speed at which the mobile communication device is travelling;

receive, from a server, information associated with the location based at least in part on the location and the travel characteristics of the mobile communication device, the server selected from a plurality of servers based at least in part on the information stored within the server of user content associated with a plurality of sites proximate the location and on the travel characteristics of the mobile device;

determine presence of of at least one site of the plurality of sites based at least in part on the information associated with the location;

obtain, based in part on the at least one site, user defined preferences for display of user content; and retrieve and display, based in part on the user defined preferences, user content associated with the site on the mobile communication device, wherein the user defined preferences are directed at the nature of the displayed user content.

* * * * *